April 22, 1969
D. PILIPOVICH
3,440,251
PERHALOETHOXY DIFLUOROAMINES
Filed Jan. 3, 1963
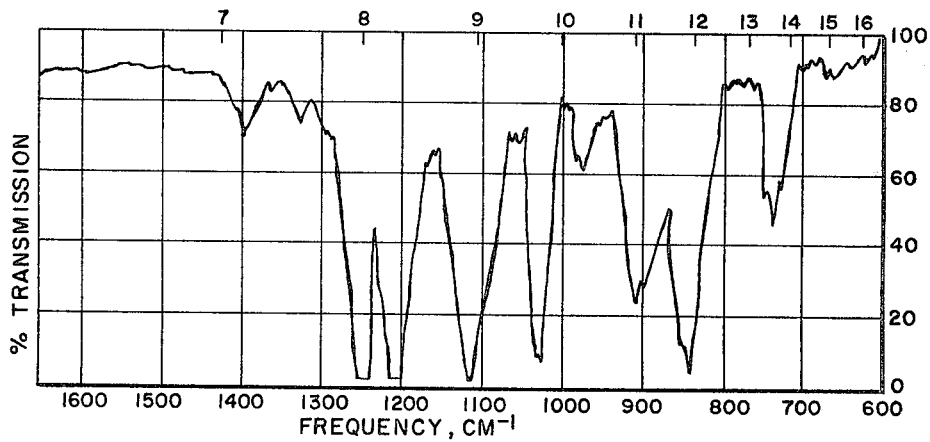
FIG. 1    INFRARED SPECTRUM OF $C_2F_5ONF_2$
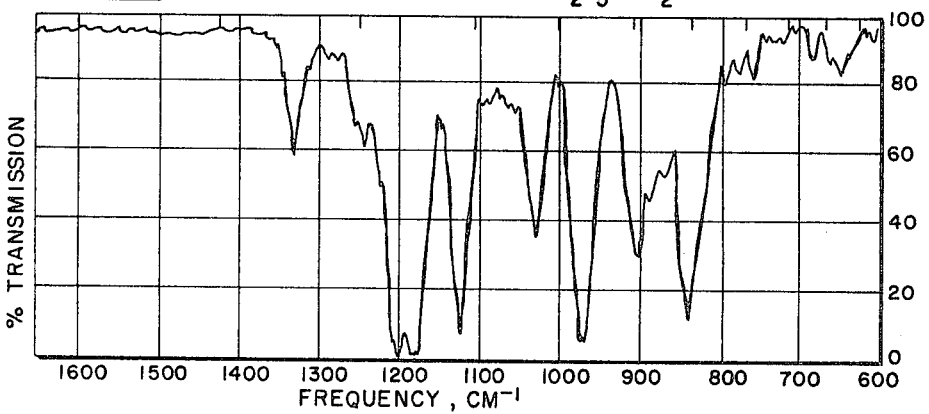
FIG. 2    INFRARED SPECTRUM OF $CF_2ClCF_2ONF_2$
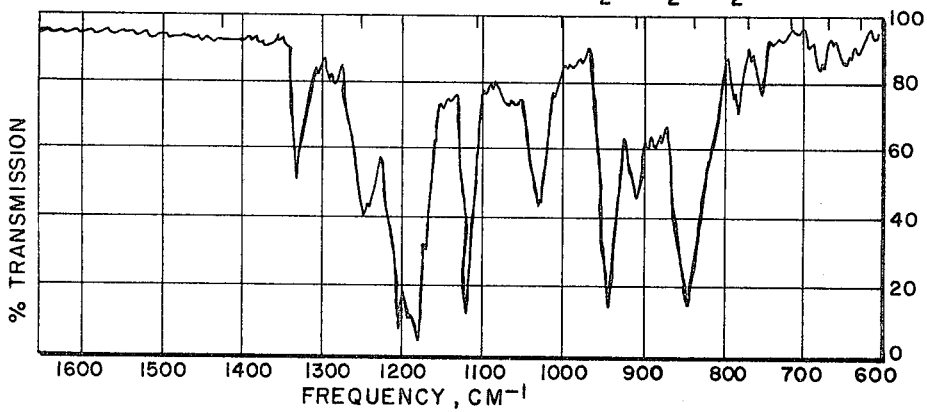
FIG. 3    INFRARED SPECTRUM OF $CF_2BrCF_2ONF_2$
INVENTOR.
DONALD PILIPOVICH
BY
ATTORNEY

United States Patent Office 3,440,251
Patented Apr. 22, 1969

3,440,251
PERHALOETHOXY DIFLUOROAMINES
Donald Pilipovich, Canoga Park, Calif., assignor to North American Rockwell Corporation, a corporation of Delaware
Filed Jan. 3, 1963, Ser. No. 249,567
Int. Cl. C07c 93/00
U.S. Cl. 260—350                           8 Claims This invention relates to new perhaloethyl-ONF$_2$ compounds and to a process for their synthesis.

The compounds of this invention are characterized as containing a fully halogenated ethyl group and an ONF$_2$ group in which the oxygen atom is attached to a carbon atom of the ethyl group. A general formula for the new compounds is:

$$CFX_2-CX_2-ONF_2$$

wherein X represents a halogen.

The process of this invention is performed by reacting trifluoramine oxide and boron trifluoride in condensed phase with a tetrahaloethylene of the general formula $C_2X_4$, wherein X represents a halogen. The chemical reaction of the process is represented by the following equation:

$$C_2X_4+NF_3O+BF_3 \rightarrow FX_2C-CX_2-ONF_2+BF_3$$

A reaction concomitant with that of the process of this invention is fluorination of the tetrahaloethylene and formation of nitrosonium tetrafluoroborate (NOBF$_4$) as described in my patent application entitled "Fluorination Process" being filed contemporaneously herewith.

Some examples of the reactant tetrahaloethylenes are tetrachloroethylene, monobromotrichloroethylene, and symmetrical difluoro-dibromoethylene.

The reactions of this invention are characterized by attachment of a fluorine atom from the trifluoramine oxide to one carbon atom of the tetrahaloethylene and by attachment of the ONF$_2$ group to the other carbon atom of the tetrahaloethylene. The boron trifluoride functions as an ionic catalyst for the reactions.

The reactions of this invention occur when the NF$_3$O, BF$_3$, and the tetrahaloethylene are placed in contact with each other in condensed phase. Mixtures of NF$_3$O and BF$_3$ form loose molecular complexes when condensed, the dissociation pressure of the solid being one atmosphere at about $-45°$ C. With an increase in pressure, however, a significant amount of the complex is present at higher temperatures, and the limiting temperature for use of the mixture, according to this invention, is that point at which the system (NF$_3$O+BF$_3$) or NF$_3$O:BF$_3$ decomposes. A preferred procedure for the process of this invention is to form a solid complex of NF$_3$O and BF$_3$ by condensation of a mixture of NF$_3$O and BF$_3$ gases in a reaction vessel and then to melt the reactant tetrahaloethylene upon the solid complex.

Separation of the perhaloethyl-NOF$_2$ compound from the reaction mixture may be accomplished by distillation, fractional condensation, or gas chromatography.

The reactant, trifluoramine oxide, has a melting point of $-161.5° \pm 1.0°$ C., and a boiling point of about $-89°$ C. calculated from vapor pressure data. It is thermally stable up to about 300° C. at autogenous pressure. It may be prepared by reacting difluoramine with chlorine trifluoride and an oxygenated halogen compound as disclosed in patent application, Ser. No. 142,459, filed Sept. 29, 1961.

With respect to concentrations of reactants, the use of stoichiometrical proportions of the reactants suggests itself; but from a purely qualitative standpoint, distinct from quantitative considerations, the fact of formation of the perhaloethyl-ONF$_2$ compound exists irrespective of the relative concentrations of the reactants. Relative molar concentrations of the reactants varying from 1 to 25 times for the tetrahaloethylene with respect to the NF$_3$O, to from 1 to 25 times for the NF$_3$O with respect to the tetrahaloethylene are practicable concentrations for the process of this invention; but inasmuch as separation operations are more efficient when stoichiometrical proportions have been used, stoichiometrical proportions may be considered as being the preferred relative concentrations for this invention.

Another facet of the matter of concentrations of reactants is that of including other constituents in the mixture of reactants. The NF$_3$O and BF$_3$ mixture may be dissolved in a suitable solvent without affecting the reactions of this invention when considered solely from a qualitative standpoint. As examples of suitable solvents for use in the process of this invention, hexafluoroacetone (CF$_3$COCF$_3$) and the perfluoro alkyl nitriles $$(C_nF_{2n+1}C\equiv N)$$

have a demonstrated solvent action on NF$_3$O-BF$_3$. Relative concentrations of solvent to solute of from 1 to 25 times one with respect to the other may be considered as being preferred. As to other inert constituents in the mixture of reactants, e.g. nitrogen and helium, this is a parameter which, because of mass action principles, affects the reaction of this invention quantitatively but not qualitatively.

The reactions between the tetrahaloethylenes and $$NF_3O+BF_3$$

are usually complete in a very short period of time, namely of the order of from one second to a half hour. The reaction begins immediately upon mixing of the reactants together. When the reactions of this invention are conducted employing a solvent, the NF$_3$O may be bubbled into a solution of BF$_3$ and the tetrahaloethylene; alternatively NF$_3$O and BF$_3$ in a solvent may be treated with the tetrahaloethylene to effect the desired reaction.

Trifluoramine oxide is a high performance oxidizer and being a liquid under cryogenic conditions, it finds utility in the field of liquid rocket propellants. It is a much more effective oxidizer than chlorine trifluoride with certain fuels. The perhaloethyl-ONF$_2$ compounds of this invention are good oxidizers for fuels of liquid rocket propellants. The new functional oxidizing group, ONF$_2$, was found to be stable both thermally and chemically. The new compounds of this invention are more stable than trifluoramine oxide and have high compatibility with reducing agents. The new compounds of this invention are unaffected by 10 percent alkali at ambient temperature and do not hydrolyze at 50° C. in saturated alkali. At ambient temperature aqueous hydrogen iodide is not oxidized by the new compounds of this invention. Elemental sodium does not suffer the new compounds to decompose at temperatures below 375° C. The new compounds are also useful as intermediates in the preparation of stable monopropellant polymers.

In the accompanying drawing, the characteristic infrared spectrums for three species of the new compounds of this invention are shown. FIGS. 1, 2 and 3 of the drawing are the infrared spectrums for perfluoroethoxy difluoramine (CF$_3$CF$_2$ONF$_2$), 2-chloro, perfluoroethoxy difluoramine, (CF$_2$ClCF$_2$ONF$_2$) and 2-bromo, perfluoroethoxy difluoramine (CF$_2$BrCF$_2$ONF$_2$) respectively.

The process of this invention is hereinafter illustrated in greater detail by description in connection with the following specific examples of the practice of it:

Example I 23 parts by weight of NF$_3$O and 12 parts of BF$_3$ were condensed in a Pyrex ampoule by cooling at $-196°$ C. 21 parts of tetrafluoroethylene was condensed upon the mixture of trifluoramine oxide and boron trifluoride and the ampoule was allowed to stand for about ½ hour with the contents of the ampoule being maintained in condensed phase. The ampoule was then allowed to warm up to ambient temperature and its contents was fractionated in a vacuum line of a series of cryogenic traps. In one of the traps which was maintained at $-146°$ C., 7.5 parts of $CF_3$-$CF_2$-$ONF_2$ (33 percent of the theoretical yield) was obtained, the same being identified by its mass cracking pattern, its infrared spectrum, and its $F^{19}$ nuclear magnetic resonance (NMR) spectrum.

The physical properties of $C_2F_5$-$ONF_2$ are as follows:

Vapor pressure _____ Log pmm $8.0222 - \frac{1271}{T}$

Boiling point (extrapolated), ° C. _ $-24.9 \pm 0.1$.
Melting point, ° C. _____ $-146.5 \pm 0.8$.
Molecular weight (average of six determinations) _____ $185 \pm 1.5$ (calc. 187).
Latent heat of vaporization _____ 5.8 kcal./mole.
Trouton constant _____ 23.5.

The mass spectrum of $C_2F_5$-$ONF_2$ is set forth in the following table.

TABLE I

| m/e | Relative intensity, percent | Ion |
|---|---|---|
| 119 | 68.7 | $C_2F_5^+$ |
| 100 | 3.4 | $C_2F_4^+$ |
| 69 | 100.0 | $CF_3^+$ |
| 66 | 2.1 | $CF_2O^+$ |
| 52 | 28.8 | $NF_2^+$ |
| 50 | 10.2 | $CF_2^+$ |
| 47 | 7.1 | $CFO^+$ |
| 33 | 7.7 | $NF^+$ |
| 31 | 12.3 | $CF^+$ |
| 30 | 23.8 | $NO^+$ |
| 19 | 1.1 | $F^+$ |
| 16 | 0.3 | $O^+$ |

Example II

Into the tip of a Pyrex ampoule was condensed 83.5 cc. of $C_2F_4$ and 64.9 cc. (STP) $BF_3$. The mixture was allowed to melt for adequate mixing and then refrozen at $-196°$ C. Trifluoramine oxide, 58.1 cc., was then condensed above the $BF_3$-$C_2F_4$ mixture. The ampoule was warmed to ambient temperature and fractionated in the vacuum line using a $-142°$ C. and a $-196°$ C. trap. The adduct, $C_2F_5ONF_2$, was completely trapped out in the $-142°$ C. fraction and amounted to 33.3 cc. (57.5 percent of theory). When unreacted $NF_3O$ was observed in the $-196°$ C. condensate, it was recondensed in the ampoule and the warming was repeated to effect further reaction. The $C_2F_5ONF_2$ was identified by its characteristic infrared spectrum and by its stable cracking pattern.

Example III

The technique described in Example II was followed using $C_2F_3Cl$ as the tetrahaloethylene reactant. The desired product in yield of about 10 percent with respect to the $NF_3O$, was identified as $CF_2ClCF_2ONF_2$. The resultant in major amount was $C_2F_5Cl$, and $NOBF_4$ was formed.

The physical properties of $CF_3ClCF_2ONF_2$ are as follows:

Vapor pressure _____ Log pmm $7.6002 - \frac{1355}{T}$
Boiling point (extrapolated), ° C. __ $13.8 \pm 0.5$.
Molecular weight (average of three determinations) _____ $204.6 \pm 3$ (calc. 20!
Latent heat of vaporization _____ 6.2 kcal./mole.
Trouton constant _____ 21.6.

The mass spectrum of $CF_2ClCF_2ONF_2$ is set forth in the following table:

TABLE II

| m/e | Relative intensity, percent | Ion |
|---|---|---|
| 137 | 16.2 | $C_2F_4Cl^+$ |
| 135 | 52.3 | $C_2F_4Cl^+$ |
| 119 | 20.7 | $C_2F_5^+$ |
| 118 | 0.6 | $C_2F_3Cl^+$ |
| 116 | 1.9 | $C_2F_3Cl^+$ |
| 100 | 9.0 | $C_2F_4^+$ |
| 87 | 32.0 | $CF_2Cl^+$ |
| 85 | 100 | $CF_2Cl^+$ |
| 69 | 19.8 | $CF_3$ |
| 68 | 2.4 | $CFCl^+$ (impurity) |
| 66 | 5.3 | |
| 52 | 27.5 | $NF_2$ |
| 50 | 22.6 | $CF_2$ |
| 49 | 1.3 | $C\ Cl^+$ |
| 47 | 4.2 | $C\ Cl^+$ |
| 47 | 8.9 | $CFO^+$ |
| 37 | 1.1 | $Cl^+$ |
| 35 | 3.4 | $Cl^+$ |
| 33 | 7.7 | $NF^+$ |
| 31 | 21.2 | $CF^+$ |
| 30 | 22.6 | $NO^+$ |
| 19 | 1.2 | $F^+$ |
| 16 | 0.5 | $O^+$ |

Example IV

The technique described in Example II was followed using $C_2F_3Br$ as the tetrahaloethylene reactant. The reactions were generally similar to those observed in the case of Example III. The desired product was identified as $CF_2BrCF_2ONF_2$. Its molecular weight, determined from the vapor density, was found to be 243 (calc. 248). As in the case of Example III, the major process in the reactions was the addition of fluorine to the double bond to yield $C_2F_5Br$. The yield of the desired adduct was on the order of 5 to 10 percent.

The mass spectrum of $CF_2BrCF_2ONF_2$ is set forth in the following table:

TABLE III

| m/e | Relative Intensity, percent | Ion |
|---|---|---|
| 211 | 0.1 | $C_2F_4BrON^+$(?) |
| 209 | 0.1 | $C_2F_4BrON^+$(?) |
| 197 | 4.6 | $C_2F_4BrO^+$ |
| 195 | 4.6 | $C_2F_4BrO^+$ |
| 181 | 66.0 | $C_2F_4Br^+$ |
| 179 | 66.1 | $C_2F_4Br^+$ |
| 162 | 2.4 | $C_2F_3Br^+$ |
| 160 | 2.4 | $C_2F_3Br^+$ |
| 131 | 99.8 | $CF_2Br^+$ |
| 129 | 100.0 | $CF_2Br^+$ |
| 119 | 83.3 | $C_2F_5^+$ |
| 112 | 7.8 | $CFBr^+$ |
| 110 | 7.8 | $CFBr^+$ |
| 100 | 27.8 | $C_2F_4$ |
| 93 | 4.2 | $CBr^+$ |
| 91 | 4.2 | $CBr^+$ |
| 81 | 37.7 | $Br^+$ |
| 79 | 37.8 | $Br^+$ |
| 69 | 59.7 | $CF_3^+$ |
| 66 | 1.5 | $CF_2O^+$ |
| 52 | 25.3 | $NF_2^+$ |
| 50 | 46.1 | $CF_2^+$ |
| 47 | 17.5 | $COF^+$ |
| 33 | 10.0 | $NF^+$ |
| 31 | 60.0 | $CF^+$ |
| 30 | 47.2 | $NO^+$ |
| 19 | 2.4 | $F^+$ |
| 16 | 8.0 | $O^+$ |

EXAMPLE V

The $BF_3$ catalyzed addition of $NF_3O$ to $C_2F_3I$, following the procedure of Example II, yielded only a trace of the desired adduct $CF_2ICF_2ONF_2$. Again, the predominant process in the reaction was the addition of fluorine to $C_2F_3I$ producing $C_2F_5I$.

It will be understood that it is intended to cover all changes and modifications of the examples of the invention herein chosen for the purpose of illustration which do not constitute departures from the spirit and scope of the invention.

Having described the invention what is claimed is:

1. A process for producing a compound of the formula $CFX_2$—$CX_2$—$ONF_2$ wherein X represents a haolgen, which process comprises reacting tetrahaloethylene with trifluoramine oxide and boron trifluoride in condensed phase.

2. A process for producing a compound of the formula $CFX_2\text{—}CX_2\text{—}ONF_2$ wherein X represents a halogen, which process comprises contacting a tetrahaloethylene with a solid complex consisting essentially of trifluoramine oxide and boron trifluoride to produce said compound, and separating said compound from its attending resultants.

3. A process for producing a compound of the formula $CFX_2\text{—}CX_2\text{—}ONF_2$, wherein X represents a halogen, the process comprising forming a solution of boron trifluoride and trifluoramine oxide in an inert solvent at a temperature below that at which substantial decomposition of the trifluoramine oxide takes place, condensing a tetrahaloethylene upon the solution whereby said compound is formed, and separating said compound from said solution.

4. A compound of the formula $CFX_2\text{—}CX_2\text{—}ONF_2$ wherein X represents a halogen.

5. The compound of the formula $C_2F_5\text{—}ONF_2$.
6. The compound of the formula $CF_2Cl\text{—}CF_2\text{—}ONF_2$.
7. The compound of the formula $CF_2Br\text{—}CF_2\text{—}ONF_2$.
8. The compound of the formula $CF_2I\text{—}CF_2\text{—}ONF_2$.

References Cited

UNITED STATES PATENTS 3,214,465   10/1965   Sausen _____ 260—350 X

LELAND A. SEBASTIAN, *Primary Examiner.*

U.S. Cl. X.R.

149—1, 109

PO-1050
(5/69)

UNITED STATES PATENT OFFICE
CERTIFICATE OF CORRECTION

Patent No. 3,440,251      Dated April 22, 1969

Inventor(s) Donald Pilipovich

It is certified that error appears in the above-identified patent and that said Letters Patent are hereby corrected as shown below:

Column 3, line 73, in Example III, change "20'" to --203.5)--

SIGNED AND
SEALED

NOV 4 1969

(SEAL)
Attest:

Edward M. Fletcher, Jr.
Attesting Officer

WILLIAM E. SCHUYLER, JR.
Commissioner of Patents